Dec. 7, 1965      J. G. HOLMSTROM      3,221,832
AUTOMOTIVE VEHICLE HAVING MEANS FOR MAKING ACTIVE
OR INACTIVE AT WILL BOTH DRIVING PROPELLER SHAFT
AND PLANETARY REDUCTION FINAL DRIVE
Filed April 6, 1961      6 Sheets-Sheet 1

INVENTOR.
JOHN G. HOLMSTROM

BY
ATTORNEYS

Dec. 7, 1965                J. G. HOLMSTROM                3,221,832
           AUTOMOTIVE VEHICLE HAVING MEANS FOR MAKING ACTIVE
            OR INACTIVE AT WILL BOTH DRIVING PROPELLER SHAFT
                 AND PLANETARY REDUCTION FINAL DRIVE
Filed April 6, 1961                              6 Sheets-Sheet 3
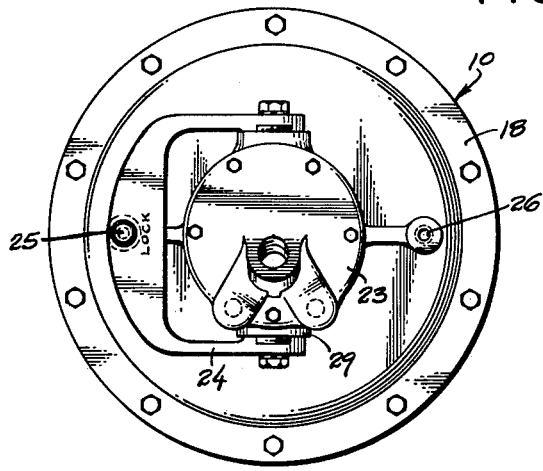
FIG. 3
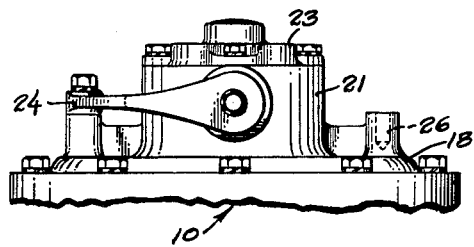
FIG. 4
FIG. 5
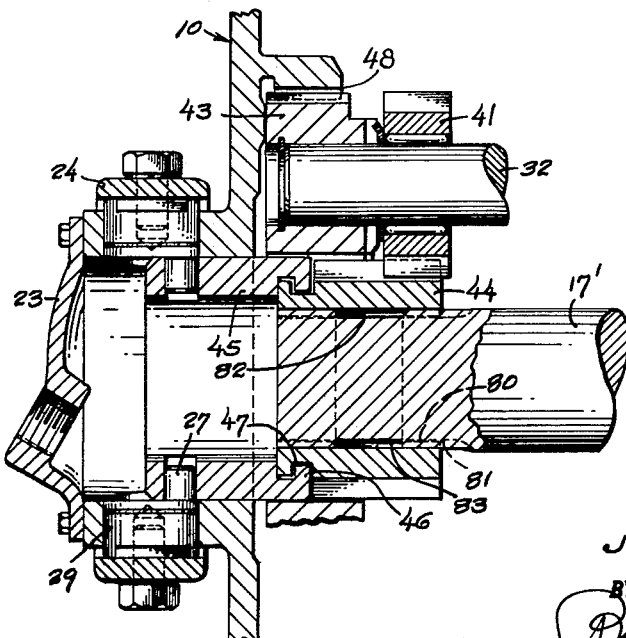
INVENTOR.
JOHN G. HOLMSTROM
BY
ATTORNEYS Dec. 7, 1965 J. G. HOLMSTROM 3,221,832
AUTOMOTIVE VEHICLE HAVING MEANS FOR MAKING ACTIVE
OR INACTIVE AT WILL BOTH DRIVING PROPELLER SHAFT
AND PLANETARY REDUCTION FINAL DRIVE
Filed April 6, 1961 6 Sheets-Sheet 4

INVENTOR.
JOHN G. HOLMSTROM
BY
ATTORNEYS

INVENTOR.
JOHN G. HOLMSTROM

ATTORNEYS

United States Patent Office 3,221,832
Patented Dec. 7, 1965

3,221,832
AUTOMOTIVE VEHICLE HAVING MEANS FOR MAKING ACTIVE OR INACTIVE AT WILL BOTH DRIVING PROPELLER SHAFT AND PLANETARY REDUCTION FINAL DRIVE
John G. Holmstrom, Seattle, Wash., assignor to Pacific Car and Foundry Company, Seattle, Wash., a corporation of Washington
Filed Apr. 6, 1961, Ser. No. 101,263
10 Claims. (Cl. 180—44)

This invention relates to automotive vehicles of the type having a planetary driven axle, and lends itself to use in any application in which traction power, and braking effort in some instances, passed to a ground wheel of a vehicle includes planetary gearing in the final drive. Examples of suitable applications are steerable front axles, single rear axles, tandem rear axles driven both from single and multiple engines, and trailer axles.

The hereinafter-recited objects of the invention will, it is believed, be best understood by here cursorily considering planetary final drives. A planetary axle usually consists of a single reduction bevel gear set in the center of the axle, termed a carrier, and a planetary reduction in each hub. The planetary ordinarily has a reduction of about 3½ to 1. The reduction in the carrier varies between 3 to 1 and 7 to 1, depending on the ratio required. Planetary axles are particularly good with large tires in that the axle shaft need carry less than one third of the wheel torque. Planetary axles are especially efficient where ground wheels from which traction is to be taken are of very large diameter and axle ratios numerically higher than 10 or 12 to 1 are required. Earthmoving trucks and trucks used in the desert are two of the many applications in which planetary axles are now being commonly used.

In substantially all planetary axle vehicles driving through both a front and a rear axle it is desirable to incorporate a means for declutching one axle from the vehicle engine when there is call for no more than the power of the rear axle to supply the traction necessary to perform the work at hand. Trucks may, for example, operate a considerable distance on a highway or a hard-surfaced trail where less than the full complement of the truck's driven axles are required for necessary traction, but may then need to negotiate an additional distance where traction is poor. The fuel consumed when all planetary axles are coupled to the engine is considerably higher than when one of the vehicle's axles is declutched. Pat. No. 2,887,201, issued to D. E. Willis, May 19, 1959, illustrates and described a de-clutch mechanism intended to be applied to an automotive vehicle as a means of driving only the rear or both the front and rear axles of the vehicle.

The act of declutching a planetary axle from a vehicle engine is, however, only a partial answer to the matter of obtaining the greatest possible efficiency, economy and otherwise, from a vehicle of the described nature during periods when maximum available ground traction is not required. Due to frictional losses, very substantial horsepower is consumed merely to turn the many gears of a planetary axle drive when such gears are idling. The present invention purposes to provide a planetary axle vehicle in which the planetary gear sets of the planetary axles may be freed at will, so as to become isolated and thus kept from turning, not only from any driving influence of a prime mover but also from the influence of the traction wheels with which the concerned planetary axle is related.

Further more particular objects and advantages of the invention will, with such foregoing object, appear and be understood in the course of the following description and claims. The invention consists in the novel construction and in the adaptation and combination of parts hereinafter described and claimed.

In the accompanying drawings:

FIGURE 1 is a fragmentary transverse vertical sectional view, with parts in elevation, illustrating the traction wheel of an automotive vehicle having a drive system constructed in accordance with the teachings of the present invention, and namely a system in which the drive from a propeller shaft to the wheel includes a set of planetary reduction gearing with means being provided, operable at will, for isolating the gearing of said planetary set both from the wheel and from the source from which power is drawn to propel the shaft. The planetary set is here shown constructed according to one embodiment of the invention.

FIG. 3 is an end view of the hub-cap portion of said wheel.

FIG. 4 is a fragmentary top plan view of the wheel.

FIG. 5 is a sectional view similar to FIG. 2 to show the set of planetary gearing arranged in accordance with a second embodiment, the scale being somewhat smaller than that of FIG. 2.

Figure 1:
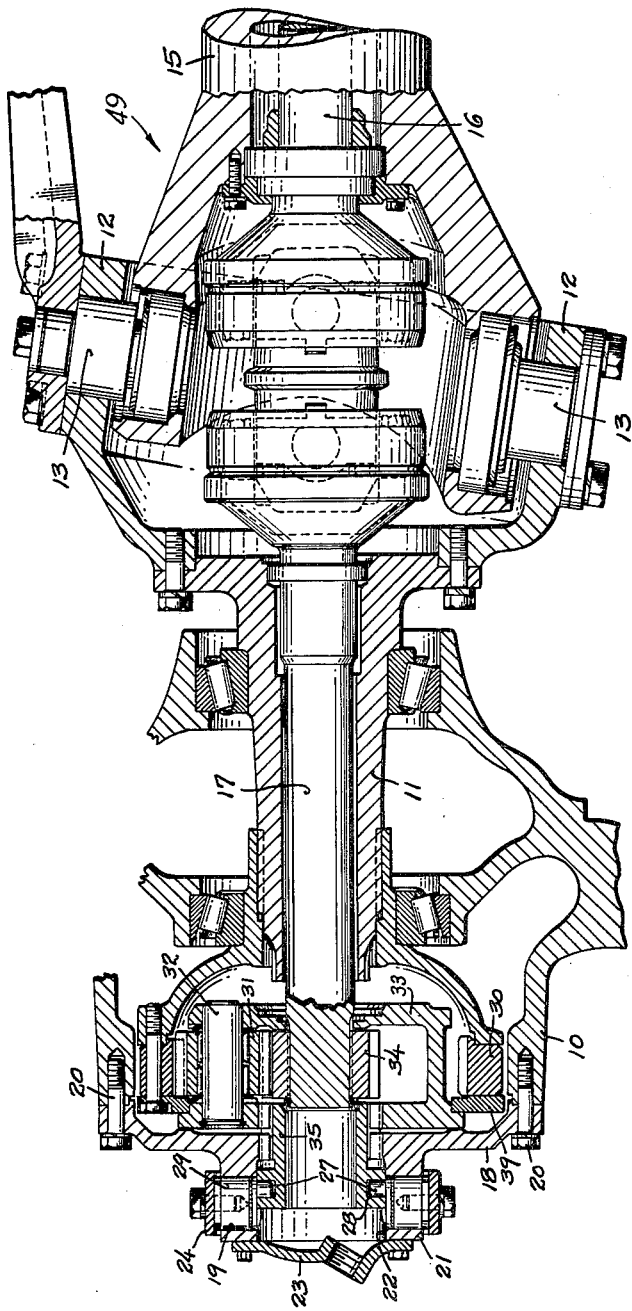
Figure 2:
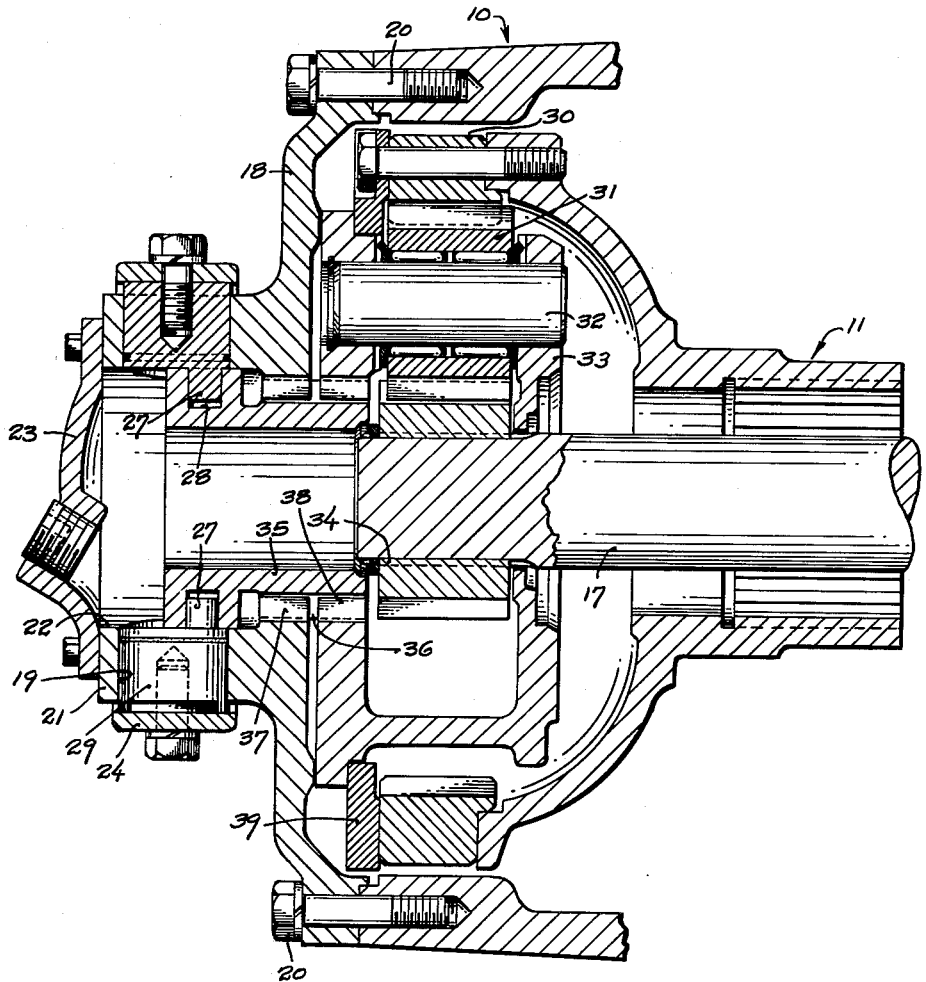
FIG. 2 is a fragmentary transverse vertical sectional view drawn to a larger scale in order to give greater detail to said first embodiment.
Figure 8:
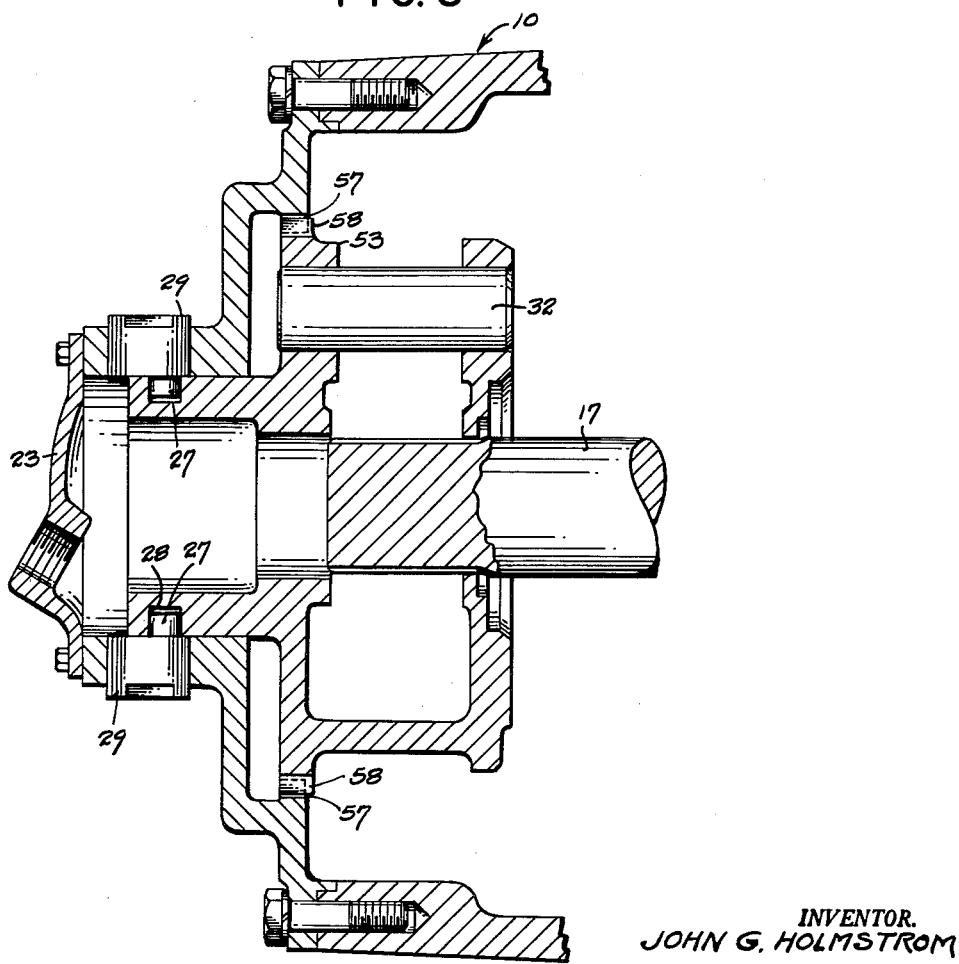
Figure 9:
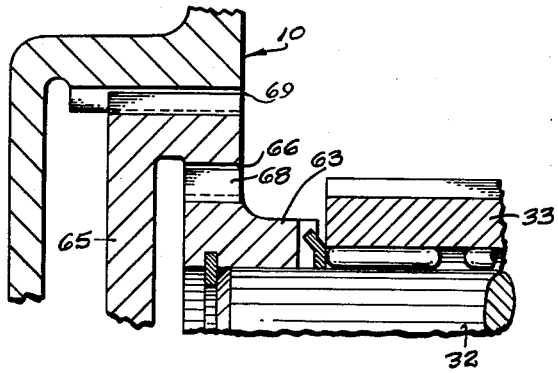
Figure 10:
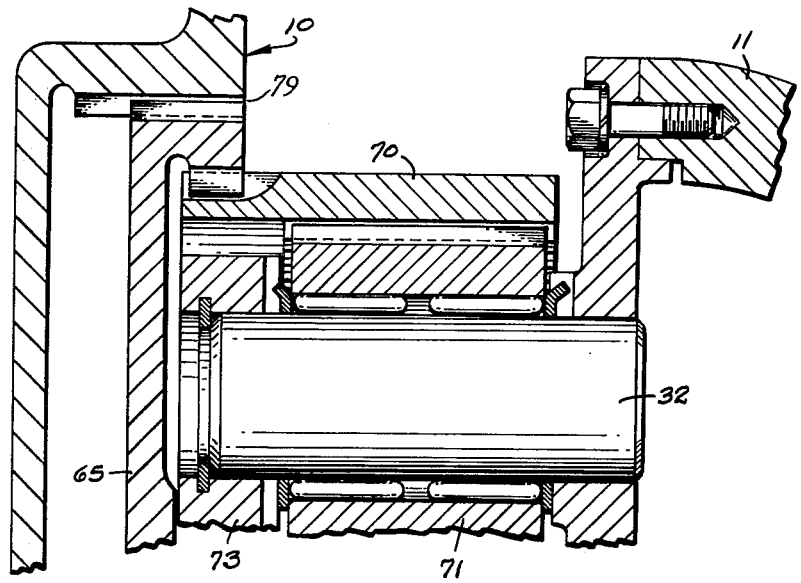
Figure 11:
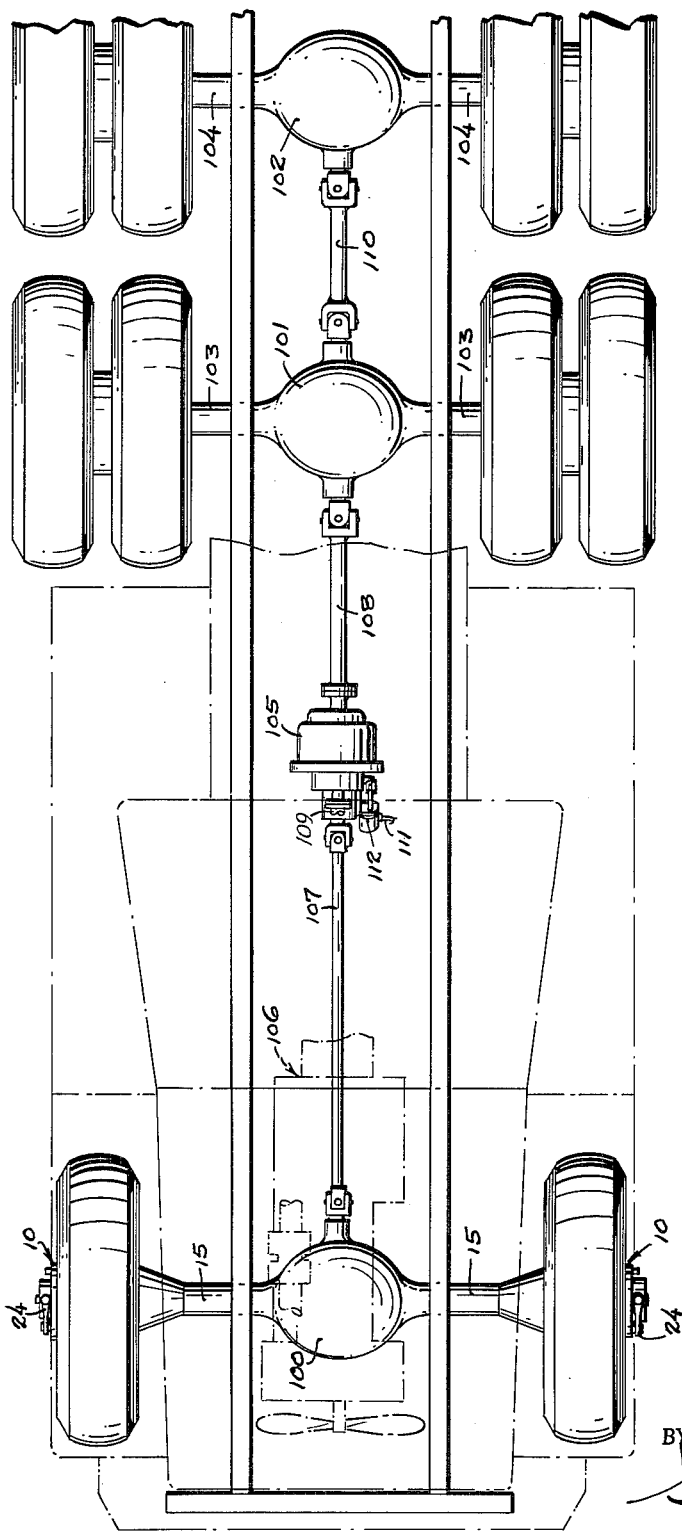

FIGS. 8, 9 and 10 are fragmentary transverse vertical sectional views illustrating three other embodiments of the invention, with the employed scale corresponding to that of FIG. 2; and FIG. 11 is a schematic fragmentary top plan view portraying a multi-axle drive vehicle having planetary gearing as a final reduction drive at each of the wheel ends of its several driven axles, providing a de-clutch mechanism between the prime mover and the said driven axles operable, when placed in its de-clutch condition, to isolate from said prime mover the forwardly extending longitudinal shaft which otherwise passes the power of the prime mover into the differential of the front axle, and also providing a mechanism of the character illustrated in the foregoing views for isolating the gearing of the two front-wheel planetary sets from the related front traction wheel.

Before proceeding with a description of the structure detailed in FIGS. 1 through 10 of the drawings, it is here expressly pointed out that an important aspect of the invention is the combination in a four-wheel drive vehicle, of live front and rear axles having a final planetary drive applied to each of the outer ends of both axles, with means for driving each of said axles from the vehicle's prime mover through a respective differential and characterized in that said driving means permits the front differential and, perforce, the front axle to be isolated from the prime mover at will, and with means for also isolating from the front wheels the related final drives, thus when employing only one axle for traction inactivating all reduction drive gearing related to the other axle. To illustrate this combination I portray in FIG. 11 a tandem rear axle vehicle in which the wheel ends of its live tandem rear axles carry respective planetary reduction final drives, and characterized in that the steering front axle is also a live axle and similarly carries planetary reduction final drives at each of its wheel ends. Housing sections for such live front axle, extending laterally in opposite directions from a differential housing 100, are denoted by 15. Differential housings for the live rear axles are denoted by 101 and 102, and the axle housing sections by 103 and 104. A transfer case 105 occupies a position between the front axle and the rear axles. An upper-level input shaft 109 carries the drive from an engine 106 (shown in phantom) to the transfer case, and lower-level output shafts 107 and 108 pass such drive into the differentials 100 and 101, respectively, a short drive shaft 110 acting in turn to pass the drive from the front tandem rear differential 101 to the rear tandem rear differential 102. Such rearwardly extending output shaft 108 is in permanent couple with the driven gears of the transfer case. The forwardly extending output shaft 107 admits of being coupled and uncoupled at will, a de-clutch mechanism of the type shown in the above-identified Willis patent being suitable for such purpose. For purposes of illustration I indicate the de-clutch mechanism as being controlled by pressure air fed through a hose 111 to operate a piston working in a cylinder 112, the piston activating a shifter arm.

Having the foregoing in mind and now referring to said drawings the numeral 10 denotes the hub of a steerable front wheel journaled for rotation upon the outer section 11 of an articulating axle housing, such housing having a bell-shaped outer end and being formed upon its inner end with knuckles 12 through which are received coaxial king pins 13 for attaching the same to the forked perch 14 formed upon the outer end of the related inner housing section 15. Such inner section is made integral with the differential housing 100 and houses the inner of two driven shaft sections 16–17 joined by a universal 49 and constituting the axle proper. The wheel hub has a moderately large opening in its center to accommodate the planetary final drive, and closing this opening is a hub cap 18 bolted, as at 20, to the wheel. The hub cap is prolonged outwardly by a center-bored boss 21. The center-bore, designated 22, is closed at the outside by a boltably secured face plate 23. For the purpose of shifting a member hereinafter to be described which is received for endwise sliding motion within said center-bore, the boss 21 is provided at diametrically opposite sides with coaxial bores 19, and journaled in these bores are trunnion pins 29 fixedly secured to and extending inwardly from the side arms of a control yoke 24. The yoke admits to a substantial 180° swing movement and may be locked at either extreme of said motion by a bolt 25 working in holes 26 tapped in boss projections of the hub cap. The trunnions connect with and impart sliding motion to the referred-to shift member by means of coaxial pins 27 located eccentric to the turning axis of the trunnions and received in a circumferential groove 28 of the shift member.

In four of the five embodiments which I have here elected to show, an internal ring gear for the planetary set is bolted to the rim of said bell-shaped end of the axle housing 11. A carrier for planet gears is made to rotate in unison with the wheel. In the other embodiment, substantially the reverse arrangement is provided, the carrier being attached to the axle housing while the ring gear is made to rotate in unison with the wheel.

First describing the embodiment of FIGS. 1 through 4, inclusive, the ring gear is denoted by 30, and the carrier by 33. Planetary pinions 31 journaled on pins 32 carried by the planet carrier mesh said ring gear and a sun gear 34 which is splined to the outer shaft section 17 of the driven axle. In this embodiment the shift member is designated by 35 and provides external splines 36 at its inner end. These splines are in constant engagement with internal splines 37 formed in the hub cap, and by slide movement of the shift member are brought selectively into and out of engagement with internal splines 38 provided by the planet carrier at its small diameter. A ring 39, split for assembly purposes, is secured to the outer face of the internal ring gear, and acts to pilot the carrier, sustaining the latter to keep the engaging teeth from getting too far out of line in case the gear set is worn. It will be apparent that a retraction of the shift member so as to draw the splines 36 free of the splines 38, performed in conjunction with an immobilizing of the propeller shaft which drives the axle, holds all of the gears of the planetary set, as well as the reduction bevel gear set housed in the differential case, in a static condition.

Figure 6:
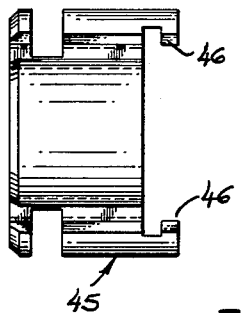
FIGS. 6 and 7 are views in side elevation and end elevation, respectively, of the shift collar employed in the embodiment of FIG. 5.
Figure 7:
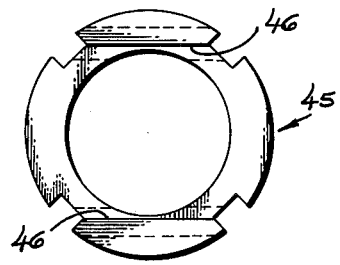

Now considering the embodiment illustrated in FIGS. 5–7, the planet carrier 43 for the planet gears 41 is in this instance splined or otherwise fixed, as at 48, to the hub cap so as to turn at all times in unison therewith, and the shift collar, here designated by 45, is connected to the sun gear 44 by tongue-forming inturned flanges 46 placed diametrically opposite to one another and having a hooking interfit in a circumferential groove 47 of the sun gear so that the two slide in unison. The sun gear is enabled to rotate freely relative to the shift collar. The shift collar admits to slide motion in a direction endwise to its axis. Machining of the hooking tongues 46 parallel to one another, as illustrated in FIGS. 6 and 7, permits ready assembly with the sun gear. Portions of interfitting internal and external splines 80 and 81, respectively, of the sun gear 44 and the axle section 17' are cut away, as at 82 and 83, so that when the shift member 45 is retracted to the outer extreme of its reciprocal slide travel the splines 80 of the shaft 17' are drawn out of engagement with the splines 81 on the sun gear 44 and thus free the axle from the sun gear. This particular embodiment, while stopping rotation of the reduction gear set located in the center—longitudinally speaking—of the axle, has the disadvantage of allowing the planetary gearing to continue to turn. It will be self-evident that the sun gear could be pulled completely free of the planet pinions while remaining on the spline, the objection thereto lying in the longer travel which would be required as the sun gear is axially moved along the splines into and out of engagement with the planet pinions.

The embodiment shown in FIG. 8 is the same as that of FIGS. 1 through 4 excepting that the shift member is made integral with the planet carrier 53 so that the carrier partakes of endwise travel in response to swinging movement of the control yoke 24. External splines 58 are provided by the carrier at its large diameter to engage and disengage with mating internal splines 57 formed upon the hub cap. In this embodiment the sun gear slides with the carrier.

The fragmentary showing of FIG. 9 illustrates a departure from the structure of FIG. 8 only in that splines 68 formed at the large diameter of the carrier 63 engage internal splines 66 of the shift member 65, the shift member in turn finding a sliding spline fit, as at 69, with the hub cap.

The fragmentary showing of FIG. 10 illustrates an inversion arrangement characterized in that the sliding spline fit 79 is between the ring gear 70 and the shift member 65, with the carrier 73 for the planet gears 71 being attached to the axle housing 11.

It is believed that the invention will have been clearly understood from the foregoing detailed description of my now preferred illustrated embodiments. Minor changes in the details of construction will suggest themselves and I accordingly intend that no limitations be implied and that the hereto annexed claims be given a scope fully commensurate with the broadest interpretation which the employed language fairly admits.

What I claim is:

1. A four-wheel drive automotive vehicle having a transfer case the input end of which is driven from the engine of the vehicle, and between the output end of said transfer case and both the front and the rear traction wheels having a respective drive connection including two reduction gear sets, one of which gear sets is common to each of two coaxial axle sections for the concerned front or the rear traction wheels, as the case may be, and occupies a position between such axle sections, and said other of which gear sets is housed in a related wheel and drive-couples the related axle section to such wheel, mechanisms operable at will for isolating all of said gear sets of one of said drive connections both from the transfer case and from the related traction wheels.

2. Structure according to claim 1 in which the wheel-housed reduction gear sets are planetary in nature.

3. Structure according to claim 1 in which the wheel-housed reduction gear sets are planetary in nature each having a sun gear, a ring gear, and planet pinions between and in mesh with said sun gear and said ring gear, said ring gear and a carrier for the planet pinions having direct connection one with the axle housing and the other with the wheel when the planetary gear set is performing its driving function.

4. Structure according to claim 1 in which the wheel-housed reduction gear sets are planetary in nature, and wherein said last-mentioned gear sets each include, with a sun gear, a respective ring gear, a set of planet pinions located between and in mesh with said sun gear and the ring gear, and a carrier for the pinions, said ring gear and the carrier for the planet pinions having connection one with the axle housing and the other with the wheel when the planetary gear set is performing its driving function so that the one thereof which is connected to the axle housing is held stationary while the other one rotates in unison with the wheel.

5. The structure recited in claim 4 characterized in that at least one of said connections last mentioned includes two elements one of which has a sliding spline fit with respect to the other to permit relative endwise motion of said elements into and out of couple, and wherein the means for isolating the reduction gear sets includes, for each set, a respective member subject to manual shift movement and having operative interconnection with said sliding spline-connected element of said reduction gear set to impart to the latter the endwise travel necessary to move the same into and out of said couple.

6. In an automotive vehicle, an axle housing, respective ground wheels carried for rotation on the two ends of said housing, axle sections journaled for rotation in the axle housing with each said section having a respective sun gear direct-coupled to its outer end, a respective reduction planetary gear set for each of said wheels including, with a related said sun gear, a ring gear and a set of planet pinions carried by a carrier so as to lie between and in mesh with the sun gear and the ring gear, means fixing the ring gear to the axle housing, a connection coupling the planet carrier directly with the wheel, and means readily accessible to an operator when the vehicle is stationary for either connecting or disconnecting said last-named couple at will so that the wheel can be either driven through the planetary gear set or made to run free of the planetary gear set, selectively.

7. In an automotive vehicle, an axle housing, respective ground wheels carried for rotation on the two ends of said housing, axle sections journaled for rotation in the axle housing each having a respective sun gear direct-coupling to its outer end, a respective reduction planetary gear set for each of said wheels including, with a related said sun gear, a ring gear, a planet carrier, and a set of planet pinions carried by said carrier so as to lie between and in mesh with the sun gear and the ring gear, said ring gear and the planet carrier being connected one with the axle housing and the other with the wheel so that the element of said reduction gear set which is connected with the wheel rotates in unison therewith during periods when it is desired to pass motion through said reduction gearing between the axle and the wheel, and means subject to manual operation and readily accessible to an operator when the vehicle is stationary for disconnecting from the wheel the element of said reduction gear set which is connected thereto so that the wheel can be made to then run free of the planetary gearing.

8. Structure according to claim 7 in which the connection last-referred to includes a shift member journaled in a center bore of the wheel for endwise sliding movement along an axis coinciding with the rotary axis of the axle and having a spline connection both with the wheel and the concerned element of the reduction gear set with at least one of said spline connections being connected by movement of the slide member to one extreme of its permitted slide travel and disconnected by movement of the member to the other extreme of said slide travel.

9. A vehicle according to claim 8 in which said shift member has a circumferential groove therein, and wherein the shift member's shift motion is imparted from a control yoke exposed at the outside of the wheel's hub and journaled by trunnions from said hub for swing motion through approxiamtely 180° about an axis which occupies a diameter of the hub, the trunnions presenting inwardly extending coaxial pins disposed eccentric to the trunnion axis and projecting into said circumferential groove.

10. Structure as recited in claim 9 having means for releasably locking the yoke against movement from either extreme of its permitted swing travel.

References Cited by the Examiner
UNITED STATES PATENTS

| | | | |
|---|---|---|---|
| 1,241,870 | 10/1917 | Megow | 74—801 |
| 1,270,490 | 6/1918 | Brown | 74—797 |
| 1,370,378 | 3/1921 | Starr | 74—801 X |
| 1,417,798 | 5/1922 | Cook et al. | 74—801 X |
| 1,464,887 | 8/1923 | Starr | 180—43 X |
| 1,523,613 | 1/1925 | Sharpneck | 180—44 |
| 1,681,893 | 8/1928 | Barshell | 180—45 |
| 2,801,702 | 8/1957 | Armington | 180—43 |
| 2,887,201 | 5/1959 | Willis | 192—67 |
| 3,058,558 | 10/1962 | Hawk | 192—67 |

A. HARRY LEVY, *Primary Examiner.*

PHILIP ARNOLD, *Examiner.*